United States Patent [19]

Terai et al.

[11] 4,176,271
[45] Nov. 27, 1979

[54] METHOD FOR PERFORMING ELECTRON BEAM WELDING

[75] Inventors: Kiyohide Terai, Ashiya; Muneharu Kutsuna, Takarazuka, both of Japan

[73] Assignee: Kawasaki Jukogyo Kabushiki Kaisha, Kobe, Japan

[21] Appl. No.: 887,721

[22] Filed: Mar. 17, 1978

[30] Foreign Application Priority Data

Mar. 18, 1977 [JP] Japan .................................. 52/29292
Mar. 18, 1977 [JP] Japan .................................. 52/29294

[51] Int. Cl.$^2$ ............................................. B23K 9/00
[52] U.S. Cl. ...................... 219/121 EM; 219/121 EB
[58] Field of Search .................. 219/121 EB, 121 EM

[56] References Cited

U.S. PATENT DOCUMENTS 3,742,365   6/1973   Sciaky .......................... 219/121 EB Primary Examiner—J. V. Truhe
Assistant Examiner—Fred E. Bell
Attorney, Agent, or Firm—Fleit & Jacobson

[57] ABSTRACT

A method of electron beam welding utilizing a plurality of fixed, evacuable chambers. The disclosed method includes the step of providing each separate chamber with a receptacle allowing quick connection and disconnection of the electron beam gun and evacuation apparatus. The disclosed method allows for welding of large-scale products in an "assembly line" type of operation where other manufacturing operations can be performed simultaneously with electron beam welding.

6 Claims, 7 Drawing Figures

METHOD FOR PERFORMING ELECTRON BEAM WELDING

The present invention relates to electron beam weldings and more particularly to a method for performing electron beam welding in an effective, sequential manner.

It has been recognized that an electron beam welding is advantageous over any other types of welding processes in respect of welding speed and reliability. Particularly, the electron beam welding has been considered as being suitable for manufacturing large scale welded structures. In recent years, the electron beam welding has got an increased importance in view of an industrial development and a consequent increase in the scale of industry which has resulted in an increased demand for a large scale welded structures of the same type.

Conventionally, such electron beam welding has been performed by using a welding chamber in which parts to be welded are placed. The welding chamber has a wall on which an electron beam gun is mounted and the parts to be welded are rotated or moved in the chambers so as to continuously expose the joint between the parts to the electron beam from the gun. Usually, an electron beam welding unit is comprised of a welding chamber equipped with an electron beam gun. It has therefore been considered that an expensive cost for an electron beam gun does not permit from the viewpoint of economy to provide a plurality of such welding unit.

Further, since the welding chamber itself is also expensive and therefore the chamber is of a relatively large scale so that it can be accommodated to various sizes of parts, a substantial time has usually been spent for preparation of work and removal of welded parts. Specificaly speaking, time has been consumed in evacuating the welding chamber after the parts have been positioned in place and also in opening the chamber after the welding operation has been completed.

It is therefore an object of the present invention to provide a method for performing electron beam welding in an effective and economical manner.

Another object of the present invention is to provide a method for electron beam welding in which costs for equipments can be substantially decreased but the welding operation can be performed in a substantially continuous manner.

According to the present invention, the above and other objects can be accomplished by a method for electron beam welding including steps of placing parts to be welded in a welding chamber, evacuating the chamber, welding the parts together at a junction therebetween by energizing an electron beam gun mounted on the chamber so that electron beam is applied to the parts at the junction, opening the chamber and taking the welded parts out of the chamber, the improvement comprises the fact that a plurality of chambers are provided for operation with different phases of said steps and a single electron beam gun is sequentially applied to one of the chambers which is under the welding step. For the purpose, the electron beam gun is moved from one chamber to another so that it can be brought into full operation substantially throughout the working time.

The above and other objects and features of the present invention will become apparent from the following descriptions of preferred embodiments taking reference to the accompanying drawings, in which.

Figure 1:
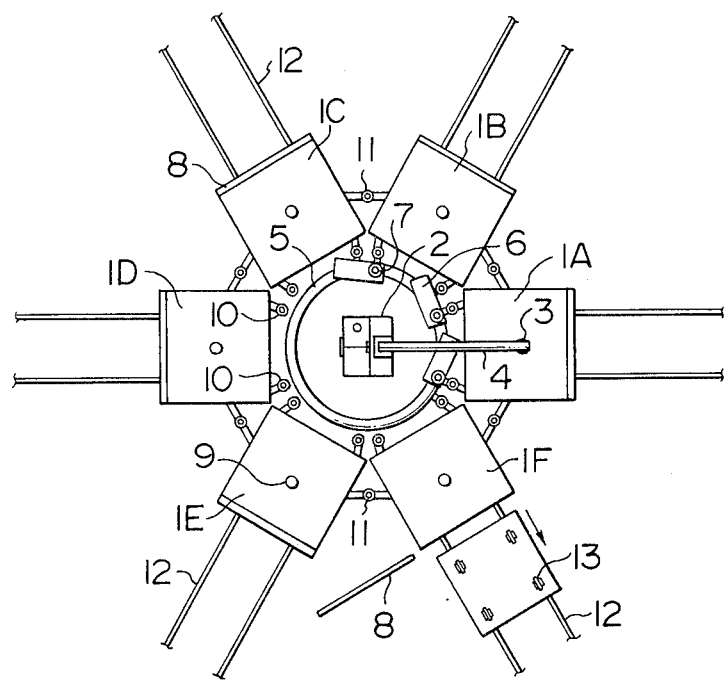
FIG. 1 is a diagrammatical plan view of one example of the electron beam welding unit for performing the method in accordance with the present invention.

Referring now to the drawings, particularly to FIG. 1, a plurality of welding chambers 1 are arranged in a circle. For the purpose of description, these chambers are designated respectively with subscripts A through F. At the center of the circle, there is provided a rotatable gun turret 2 which carries an arm 4 having an electron beam welding gun 3 at the free or outer end thereof. Circular rail means 5 is provided coaxially with the circle along which the chambers 1A through 1F are arranged. On the rail means 5, there are disposed three sets of evacuating pumps 6, each having a valve 7 and being movable along the rail means 5.

Each of the chambers has an end opening which is covered by a closure 8. Further, each chamber is provided at the top portion thereof with a receptacle 9 for the gun 3. At the end adjacent to the rail means 5, each chamber is provided with a pair of evacuating conduits, each having a valve 10. Each adjacent two chambers are connected by means of a conduit having a valve 11. A pair of rails 12 are provided for each chamber 1 so that works or parts to be welded can be carried into the chamber 1 through the end opening by means of a carriage 13 movable along the rails 12.

In FIG. 1, the chamber 1A is shown at a stage of welding step so that the chamber is evacuated after the parts to be welded are placed in position and the vacuum in the chamber 1A is maintained by two pumps 6 which are connected through the valves 7 with the evacuating conduits having the valves 10. The electron beam gun 3 is connected with the receptacle 9 on the chamber 1A so as to apply electron beam to the parts placed therein.

The chamber 1B is shown in the stage of evacuating step. More specifically, the chamber 1B is charged with the parts to be welded and one evacuating pump 1B is connected with one of the evacuating conduits for evacuating the chamber 1B.

The chamber 1D is shown in the stage that it is charged with parts to be welded and the end opening is closed by the closure 8. This chamber will then be evacuated in a later stage.

The chamber 1E is shown in the stage of releasing vacuum. More specifically, the welding operation has been completed and the valve 11 in the conduit between the chambers 1D and 1E is opened so that the pressure in the chamber 1D is drawn into the chamber 1E. After the pressures in the chambers 1D and 1E are balanced, the valve 11 in the conduit between these chambers is closed and the valve 11 in the conduit between the chambers 1E and 1F is opened so that the atmospheric pressure is introduced through the chamber 1F before the closure 8 is removed from the chamber 1E. This procedure of releasing vacuum is advantageous in that the chamber 1D can partly be evacuated before it is connected with the evacuating pump 6.

The chamber 1F is shown in the stage of operation in which the chamber has already been relieved of vacuum and the closure 8 has been removed. The welded parts are taken out of the chamber 1F by moving the carriage 13 on the rails 12. The chamber 1C is provided as a spare one.

After the welding process has been completed in the chamber 1A, the evacuating pumps 6 are removed from this chamber and one of them is connected with the remaining one of the evacuating conduits in the chamber 1B so that this chamber is now evacuated by two pumps 6. The other of the pumps 6 removed from the chamber 1A is connected to one of the evacuating conduits of the chamber 1D. The electron beam gun 3 is then removed from the chamber 1A and connected with the receptacle 9 on the chamber 1B by rotating the arm 4 counterclockwise.

In order to ensure the most effective operation, it is important to determine the number of chambers to be used for the operation in accordance with the time required for the welding process as well as the times for charging the parts in each chamber, for evacuating each chamber, for releasing vacuum from each chamber and for taking the welded parts out of the chamber. For example, when the time required for the electron beam welding is so small that the five chambers are not adequate to keep the gun in full operation, the chamber 1C may additionally be used. If the time for the welding is relatively long, only four or less chambers may be used.

FIGS. 2 through 6 show an example of a mechanism for removably installing the gun 3 on the chamber 1. As previously described, each chamber 1 is provided with a receptacle 9 for the gun 3. The receptacle 9 is in the form of a cylinder having an inwardly extending flange 14 which is formed with a central aperture 15 for allowing electron beam to pass therethrough. An electromagnetically actuated valve 16 is provided in such a manner that it cooperates with the aperture 15 so that the aperture 15 is air-tightly closed by the valve 16 when the gun 3 is not installed on the receptacle 9.

Figure 6:
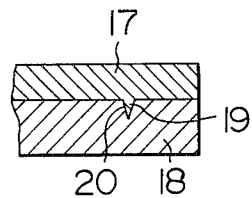
FIG. 6 is a fragmentary sectional view in an enlarged scale of the seat for receiving the electron beam welding gun.

The gun 3 has a cylindrical outer surface which is adapted to be fitted to the receptacle 9. The gun 3 is formed with an outwardly extending flange 17 and the receptacle 9 has a corresponding flange 18. As shown in FIG. 6 in detail, the flange 17 on the gun 3 is formed on the lower surface with an annular projection 19 and the flange 18 is formed on its upper surface with a correspondingly shaped recess 20 so that the gun 3 can be appropriately centered in the receptacle 9 by bringing the projection 19 on the flange 17 into engagement with the recess 20 on the flange 18. Further, the engagement between the projection 19 and the recess 20 can provide an air-tight seal.

Figure 3:
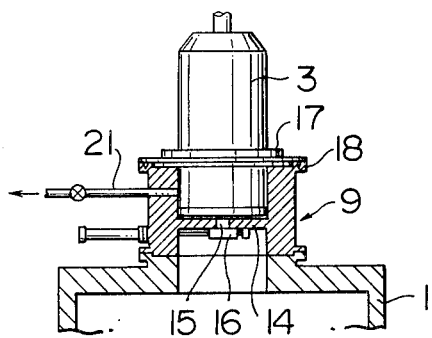
Figure 5:
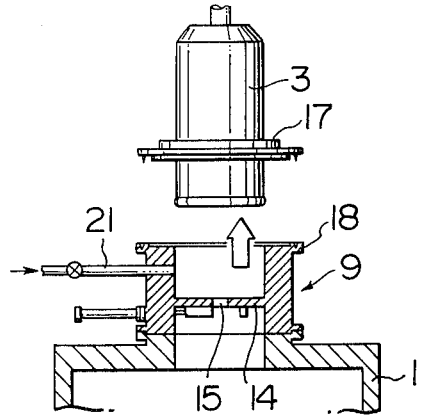

The receptacle 9 is provided with an evacuating conduit 21 which may be connected with the pump 6 as desired so that the space in the receptacle 9 between the flange 14 and the flange 17 can be evacuated after the gun 3 has been installed on the receptacle 9 as shown in FIG. 3 at the same time when the chamber 1 is evacuated. Thereafter, the valve 16 is electromagnetically actuated to open the aperture 15 and the electron beam gun 3 is energized for welding.

As soon as the welding operation has been completed, the conduit 21 is opened to the atmosphere so that the atmospheric pressure is introduced into the aforementioned space in the receptacle through this conduit. Then, the gun 3 is removed from the receptacle 9 so that it is used on another chamber 1.

Figure 7:
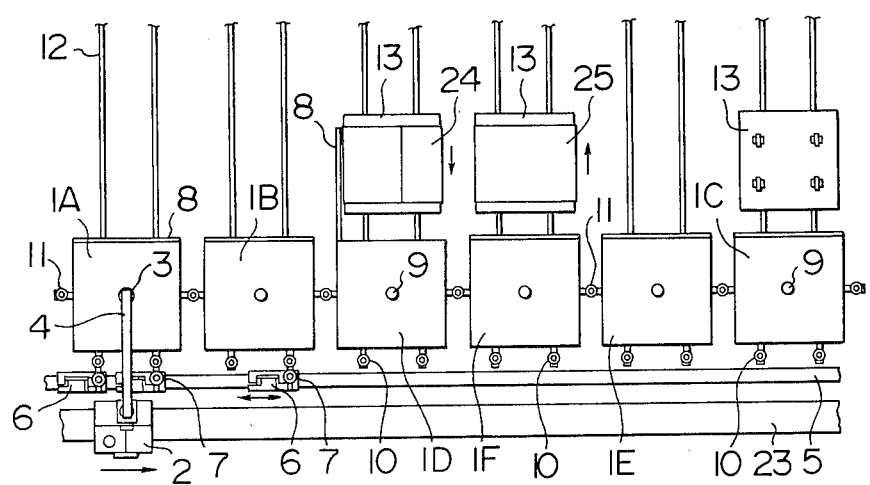
FIG. 7 is a diagrammatical plan view showing another example of the electron beam welding unit.
Figure 2:
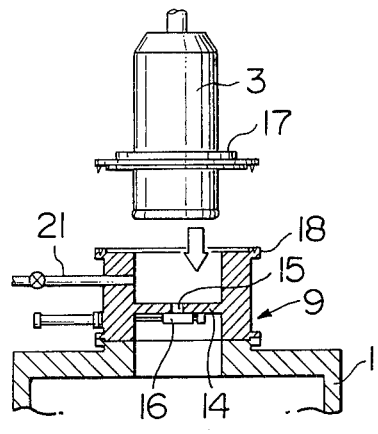
FIGS. 2 through 5 are fragmentary sectional views of the arrangement for removably mounting an electron beam welding gun on a welding chamber.
Figure 4:
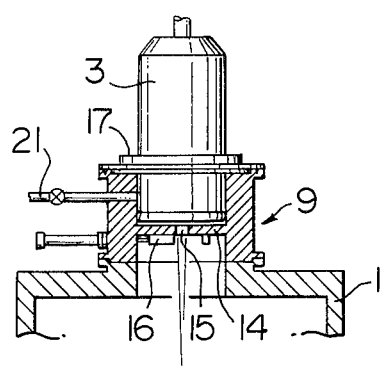

Referring now to FIG. 7, there is shown another example of welding system in which the method of the present invention can be accomplished. In this example, welding chambers 1A through 1F are arranged in a linear row in parallel with a linear rail 5 on which evacuating pumps 6 are provided for movement therealong. A further rail 23 is provided in parallel with the rail 5 and a beam gun carriage 2 is arraged to move along the rail 23. A gun arm 4 is mounted at one end on the carriage 2 and has an electron beam gun 3 at the other end. As in the previous example, each chamber 1 is provided at the top with a receptacle 9 for the gun 3 which may be constructed as described with reference to FIGS. 2 through 6. Further, each two adjacent chambers 1 are connected together by means of a conduit having a valve 11. Each chamber has at an end adjacent to the rail 5 a pair of conduits each having a valve 10 for connection with the evacuating pumps 6. At the opposite end, each chamber 1 has an opening which is adapted to be closed by a closure 8. A pair of rails 12 are provided in association with each chamber 1 for moving a work carriage 13 into and out of the chamber 1 through the end opening. In FIG. 2, the carriage 13 associated with the chamber 1D is shown as having parts 24 to be welded and it is being moved into the chamber 1D. The carriage 13 associated with the chamber 1F has a welded product 25 and is shown as just having been moved out of the chamber 1F.

As in the previous example, the chamber 1A is under welding operation so that the gun 3 is connected with this chamber 1A. Further, the chamber 1A is maintained under vacuum by means of two evacuating pumps 6. The chamber 1B is being evacuated by means of one pump 6. The chamber 1E is being at the stage of releasing vacuum by opening the valve 11 in the conduit between the chambers 1E and 1F.

From the foregoing descriptions, it will be understood that the present invention makes it possible to keep the electron beam gun in full operation by associating a plurality of welding chambers with a single gun. The present invention is particularly suitable for the welding process in which a lot of same or similar welded products are to be manufactured. The welding chambers may be of large volume so that they can be accommodated to various sizes of works and therefore substantial time may be spent not only in evacuating the chambers but also in carrying the works into and out of the chambers and releasing the vacuum in the chambers. However, according to the present invention, the plurality of chambers are used in different stages of operation so that an electron beam gun can be used sequentially with respect to the chambers to provide an effective production.

The invention has been shown and described with reference to specific examples, however, it should be noted that the invention is in no way limited to the details of the illustrated arrangements but changes and modifications may be made without departing from the scope of the appended claims.

We claim:

1. Method for electron beam welding including steps of placing parts to be welded in a welding chamber, evacuating the chamber, welding the parts together at a junction therebetween by energizing an electron beam gun mounted on the chamber so that an electron beam is applied to the parts at the junction, opening the chamber and taking the welded parts out of the chamber, the improvement comprises the fact that a plurality of fixed chambers each separated one from another are provided for operation with different phases of said steps each separate fixed chamber being provided with receptacle means allowing quick connection and disconnection of the electron beam gun, and sequentially applying evacuation means and a single electron beam gun to the one of the chambers which is undergoing the welding step.

2. Method in accordance with claim 1 which includes a further step of releasing vacuum from the chamber before the chamber opening step.

3. Method in accordance with claim 2 in which five chambers are used in such a manner that first chamber is under the welding step, second one under the evacuating step, third one under the parts placing step, forth one under the vacuum releasing step and fifth one under taking out step.

4. Method in accordance with claim 3 in which a further chamber is provided as a spare.

5. Method in accordance with claim 1 in which use is made of such chambers having receptacle means allowing quick connection and disconnection of the electron beam gun.

6. Method in accordance with claim 3 in which vacuum of the first chamber is maintained by two evacuating pumps and the evacuating step on the second chamber is performed by one evacuating pump.

* * * * *